(12) United States Patent
Lim et al.

(10) Patent No.: US 7,403,490 B2
(45) Date of Patent: Jul. 22, 2008

(54) OAM CAPABILITY DISCOVERY METHOD IN ETHERNET PASSIVE OPTICAL NETWORK

(75) Inventors: Se-Youn Lim, Seoul (KR); A-Jung Kim, Seoul (KR); Min-Hyo Lee, Suwon-shi (KR); Su-Hyung Kim, Seoul (KR); Jae-Yeon Song, Songnam-shi (KR); Jin-Hee Kim, Suwon-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 899 days.

(21) Appl. No.: 10/634,694

(22) Filed: Aug. 5, 2003

(65) Prior Publication Data

US 2004/0057727 A1 Mar. 25, 2004

(30) Foreign Application Priority Data

Sep. 19, 2002 (KR) ............... 10-2002-0057296

(51) Int. Cl.
*H04L 12/28* (2006.01)
(52) U.S. Cl. ..................................... 370/254
(58) Field of Classification Search ................ 370/254, 370/255, 464, 474–477, 431–433, 437; 359/109, 359/115, 118; 709/220–226
See application file for complete search history.

(56) References Cited

U.S. PATENT DOCUMENTS

| | | | | | |
|---|---|---|---|---|---|
| 6,028,860 | A | * | 2/2000 | Laubach et al. | 370/395.64 |
| 6,144,665 | A | * | 11/2000 | Karasawa | 370/395.1 |
| 6,804,256 | B2 | * | 10/2004 | Chang | 370/468 |
| 6,834,052 | B1 | * | 12/2004 | Karasawa | 370/395.1 |
| 7,127,167 | B2 | * | 10/2006 | Sala et al. | 398/72 |
| 7,209,443 | B2 | * | 4/2007 | Mukai et al. | 370/235 |
| 2003/0177215 | A1 | * | 9/2003 | Sutherland et al. | 709/223 |

FOREIGN PATENT DOCUMENTS

WO    WO 97/09807    3/1997

OTHER PUBLICATIONS

ONU auto discovery, IEEE 802.3ah Ethernet in the First Mile Task Force, Mar. 2002, 19 pages.*
ONU auto discovery, IEEE 802.3ah Ethernet in the First Mile Task Force, May 2002, 21 pages.*
Johnson, Dr. H.; "IEEE P802.3z/D1 Overview;" Packet Engines Incorporated Gigabit Ethernet; Jan. 23, 1997.
ITU-T Study Group 15 (1997-2000); ITU-T Recommendation G983. 1; "Broadband Optical Access Systems based on Passive Optical Networks (PON);" Series G: Transmission Systems and Media, Digital Systems and Networks.

(Continued)

*Primary Examiner*—Dmitry Levitan
(74) *Attorney, Agent, or Firm*—Cha & Reiter, LLC (57) ABSTRACT

An OAM capability discovery method in Ethernet passive optical network is disclosed. An OLT assigns identifications according to a registration request of the plurality of ONUs connected to the OLT. In response, the OLT transmits an OAM capability information message of the OLT to a random ONU from among the registered plurality of ONUs, and the random ONU transmits an OAM capability information message of the random ONU to the OLT, then finally the OLT transmits an OAM capability discovery completion message to ONU.

10 Claims, 6 Drawing Sheets

| CD state | Message Type |
|---|---|
| 0 0 | OAM message[0x00] after OAM Capability Discovery |
| 0 1 | Initiate_OAM_Discovery |
| 1 0 | Report_OAM_Discovery |
| 1 1 | Complete_OAM_Discovery |

OTHER PUBLICATIONS

Interworking Task Group of IEEE 802.1; IEEE P802.1ah/D1.0; "Virtual Bridged Local Area Networks—Amendment 6: Provider Backbone Bridges;" IEEE; Jul. 17, 2005.

IEEE Draft P802.3ah/D1.0; 2002; 599 pgs.

Lim, Seyoun; et al.; OAM Capability Discovery; IEEE 802.3ah EFM—New Orleans, Sep. 2002; 9 pgs.

* cited by examiner

| OCTETS | | |
|---|---|---|
| 1 | TLV_type_=Local_Status | |
| 1 | Local_Status_Length=0x14 | |
| 2 | Local_State | ~201 |
| 2 | Local_OAM_Configuration | |
| 2 | Local_OAMPDU_Configuration | |
| 2 | Local_Loopback_Configuration | |
| 6 | Local_Extension | |
| 0 | Local_placeholder | |
| 1 | Local_Allocated_channel | ~203 |
| 1 | Local_Topology | ~205 |
| 6 | Reserved | |
| 1 | TLV_type=Far_End_Status | |
| 1 | Far_End_Status_Length=0x14 | |
| 2 | Far_End_State | ~207 |
| 2 | Far_End_OAM_Configuration | |
| 2 | Far_End_OAMPDU_Configuration | |
| 2 | Far_End_Loopback_Configuration | |
| 6 | Far_End_Extension | |
| 0 | far_end_placeholder | |
| 1 | Far_Allocated_channel | ~209 |
| 1 | Far_Topology | ~211 |
| 6 | Reserved | |

| CD state | Message Type |
|---|---|
| 0 0 | OAM message[0x00] after OAM Capability Discovery |
| 0 1 | Initiate_OAM_Discovery |
| 1 0 | Report_OAM_Discovery |
| 1 1 | Complete_OAM_Discovery |

FIG.8

OAM CAPABILITY DISCOVERY METHOD IN ETHERNET PASSIVE OPTICAL NETWORK

CLAIM OF PRIORITY

This application claims priority to an application entitled "OAM capability discovery method in Ethernet passive optical network," filed in the Korean Intellectual Property Office on Sep. 19, 2002 and assigned Serial No. 2002-57296, the contents of which are hereby incorporated by reference.

BACKGROUND OF THE INVENTION

1. Field of the Invention

The present invention relates to an Ethernet passive optical network (EPON), and more particularly to an OAM (Operations, Administration and Maintenance) capability discovery method that may be implemented in a passive optical network.

2. Description of the Related Art

The standardization of Gigabit Ethernet and MAC technology for the ATM-PON (Asynchronous Transfer Mode Passive Optical Network) has been completed. In the ATM-PON, upward or downward transmission of frames, each of which consists of a predetermined number of ATM cells, is used for communication purposes. In particular, an OLT (Optical Line Termination) inserts downward cells in the transmission frame, and then the downward cells are distributed to each ONU (Optical Network Unit) in the PON having a tree-shaped structure. Other details of the Gigabit Ethernet and the ATM-PON protocols are described in the IEEE 802.3z dated Jan. 23, 1997. and ITU-T G.983.1 dated Oct. 13, 1998, from which the contents of both documents are incorporated herein by reference.

Figure 1:
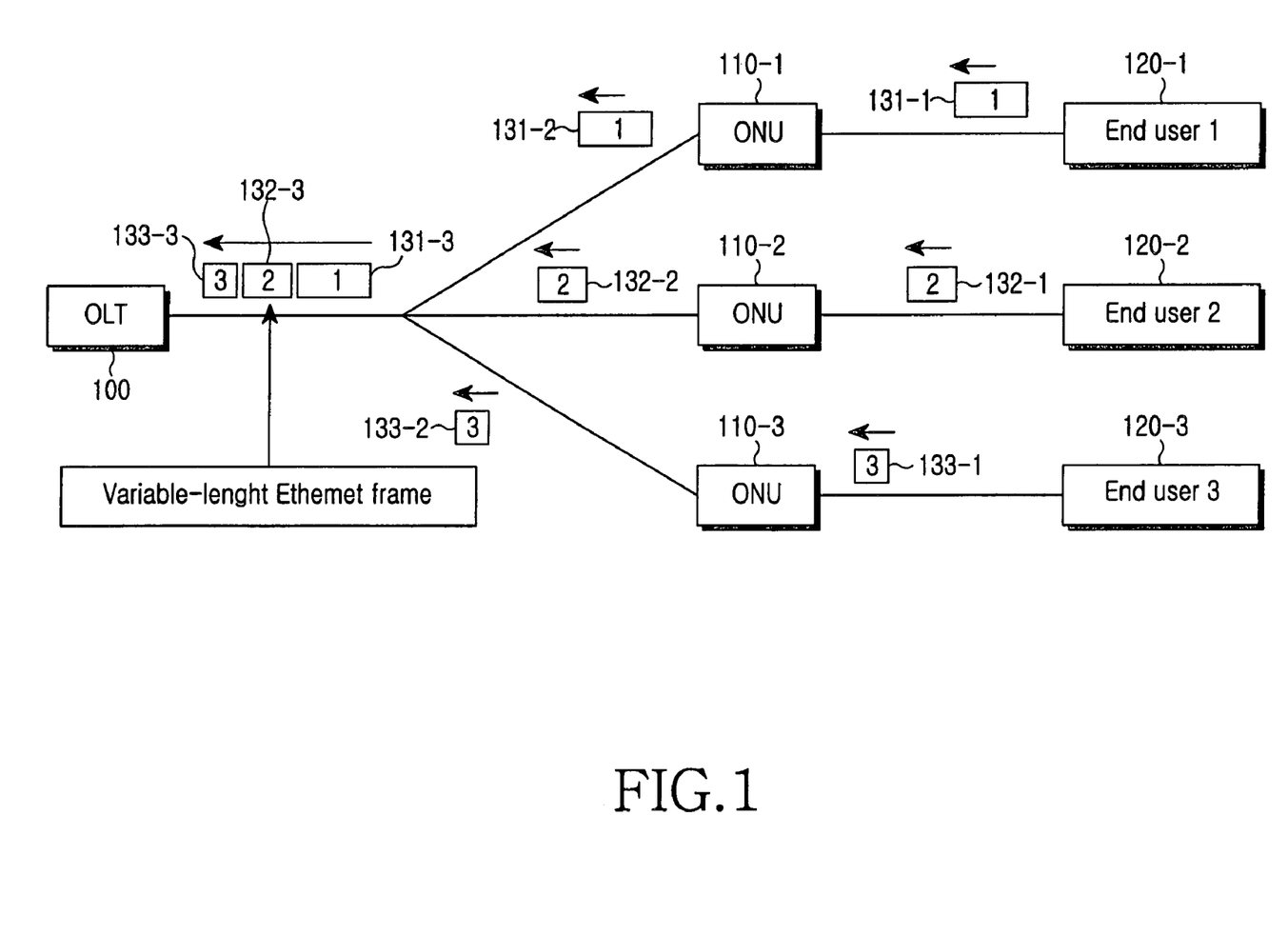
FIG. 1 is a block diagram showing the physical network structure of a general passive optical network.

FIG. 1 is a block diagram showing the physical network structure of a general passive optical network (PON). As shown, the PON includes an OLT 100 and a plurality of ONUs 110-1 to 110-3 connected to the OLT 100. FIG. 1 is an example in which three ONUs 110-1 to 110-3 are connected to one OLT 100 in the Ethernet Passive Optical Network, which transmits 802.3 Ethernet frames via a point to multi-point network. Here, multiple users 120-1 to 120-3 (users or network equipments) may be connected to the ONUs 110-1 to 110-3, respectively, so that data 131-1 to 133-1 transmitted by the users 120-1 to 120-3 can be transmitted to the OLT 100 via the ONUs 110-1 to 110-3.

As shown in FIG. 1, in the case of upward transmission, all data of the ONUs are accessed by means of a TDM (Time Division Multiplexing) method. An ODN (Optical Distribution Network), which is a passive element, enables the data not to be collided with each other by means of a ranging method. In the case of downward transmission, each of the ONUs 110-1 to 110-3 receives data broadcasted by the OLT 100. Each frame in upward or downward transmission has a field arranged in a dedicated ATM cell or a general ATM cell, by which messages can be sent or received at predetermined intervals.

However, with the development of the Internet technology, more bandwidth at the subscriber's ends are required, and to address this need, a point-to-point transmission by means of Gigabit Ethernet, which is relatively low-priced and can secure a higher bandwidth in comparison to the ATM technology, is utilized. In this regard, the ATM has drawbacks in that it requires relatively expensive equipment, has limited bandwidth, and requires the segmentation of IP packets. As such, even in the PON structure of the subscriber network, the Ethernet type is more favored rather than the ATM technique.

In order to provide services by means of Ethernet-based passive optical network, it is necessary for the provision of OAM capability, which does not exist in the existing Ethernet. The OAM has been defined recently in an EPON standardization but still being developed in IEEE 802.3ah EFM TF, Draft v1.0. The OAM capability defined in the Draft v1.0 up to now is a basic function, which supports Remote Failure Indicating function, Remote Loop-back function, and Link Monitoring function, as described in IEEE 802.3ah EFM. However, since detailed operation processes for the OAM discovery method are not defined in the Draft v1.0, some problems may occur in attempts to perform the OAM protocols effectively. In other words, no uniform discovery process for the OAM capability is available between the OLT 100 and the ONU 110. As a result, any OAM capabilities defined and used by different vendors will not cooperate with each other as the frames may be unrecognizable to each other.

SUMMARY OF THE INVENTION

Accordingly, there is a need for a new scheme to provide an OAM capability discovery method, which enables an OLT and an ONU to perform discovery for their OAM capabilities.

The present invention is related to an OAM capability discovery method for performing an OAM effectively after setting the OAM capabilities that can be supported by both an OLT and an ONU.

In one preferred embodiment of the present invention, there is provided an OAM capability discovery method in which an OLT performs the OAM discovery method for multiple ONUs connected to the OLT in an Ethernet passive optical network. The method includes the steps of: assigning by the OLT identifications for identifying each of the ONUs according to registration requests from the ONUs connected to the OLT, and starting by the OLT an OAM capability discovery operation for the OAM capabilities of the ONUs by transmitting first OAM capability information messages; and receiving by the OLT second OAM capability information messages for reporting the OAM capabilities of the ONUs from the ONUs having received the first OAM capability information message.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Figure 2:
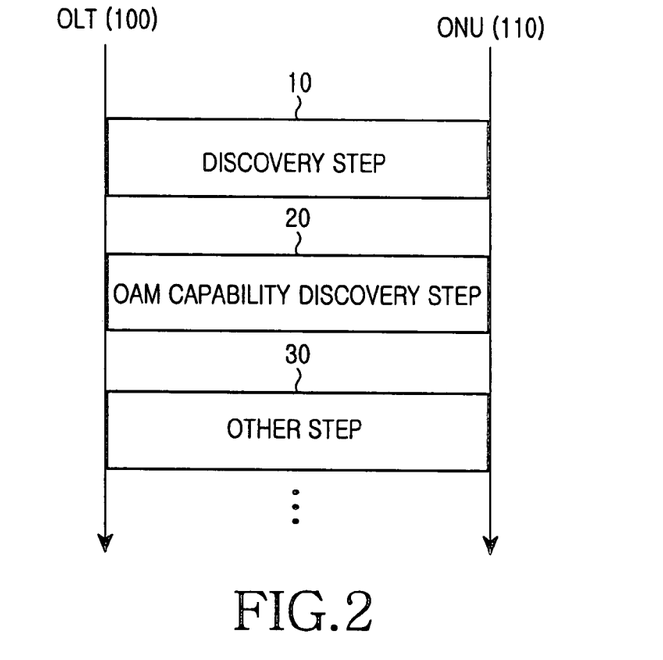
FIG. 2 is a view showing the placement where OAM capability discovery process occurs between OLT and ONU.

Referring to FIG. 2, an OAM capability discovery processes according to the teachings of the present invention are performed just after the discovery process between an OLT (Optical Line Termination) 100 and an ONU (Optical Network Unit) 110 have been completed. In particular, FIG. 2 shows the operation steps by which the OAM capability discovery process between the OLT 100 and the ONU 110 is performed according to an embodiment of the present invention. Briefly, the OLT 100 performs a discovery process, which assigns an ID for identifying the ONU 110 according to a registration request of the connected ONU 110 in step 10. In step 20, the OLT 100 and the ONU 110 perform an operation for discovering the capability of each other, and then in step 30, a number of other subsequent steps are performed.

Figure 3:
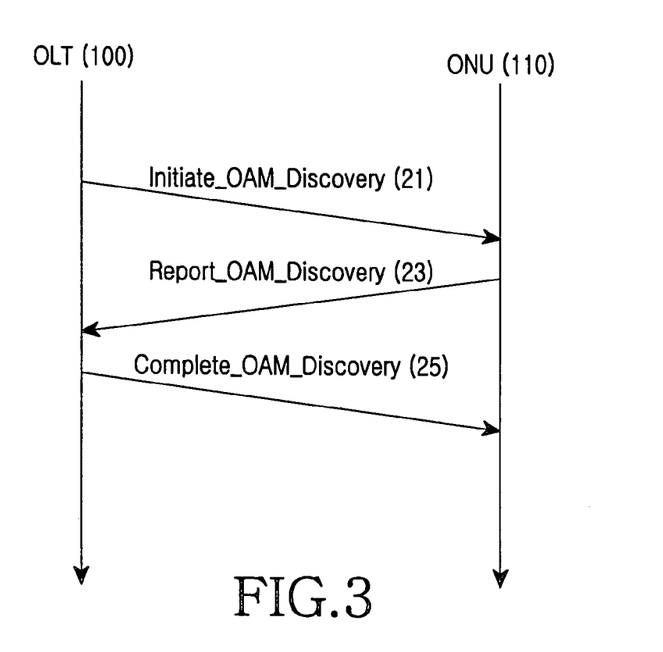
FIG. 3 a view showing detailed steps of the OAM capability discovery process according to an embodiment of the present invention.

Referring to FIG. 3, the OAM capability discovery process according to the embodiment of the present invention is realized on a three-way handshaking. As shown, messages transmitted/received according to the operation procedure includes an OAM capability information message of the OLT Initiate_OAM_Discovery, an OAM capability information message of the ONU Report_OAM_Discovery, and OAM capability discovery completion message Complete_OAM_Discovery. In addition, in order to improve the reliability in the exchange of all messages, reception wait time (discovery_time) for waiting for a message received corresponding to a transmitted message is set in advance in the present invention.

The process in which the OLT 100 and the ONU 110 transmit/receive the messages according to the OAM capability discovery processes is described hereinafter with reference to FIG. 3.

As shown in FIG. 3, the OLT 100 starts the OAM capability discovery by transmitting an OAM capability of the OLT 100 to the registered ONU 110 by means of "Initiate_OAM_Discovery" message in step 21. Herein, when the "Report_OAM_Discovery" message is not received from the ONU 110 within a predetermined time period (discovery_time), the OLT 100 retransmits the "Initiate_OAM_Discovery" message until the "Report_OAM_Discovery" message is received within the predetermined time period (discovery_time).

The ONU 110 having received the "Initiate_OAM_Discovery" message from the OLT 100 transmits an OAM capability of the ONU 110 to the OLT 100 by means of the "Report_OAM_Discovery" message in step 23. Herein, when the "Complete_OAM_Discovery" message is not received from the OLT 100 within the predetermined time period (discovery_time), the ONU 110 retransmits the "Report_OAM_Discovery" message until the "Complete_OAM_Discovery" message is received within the predetermined time period (discovery_time).

In step 25, the OLT 100 having received the "Report_OAM_Discovery" message from the ONU 110 transmits the "Complete_OAM_Discovery" message to the ONU 110, and then informs the ending of the OAM capability discovery between the OLT 100 and the ONU 110.

Figure 4:
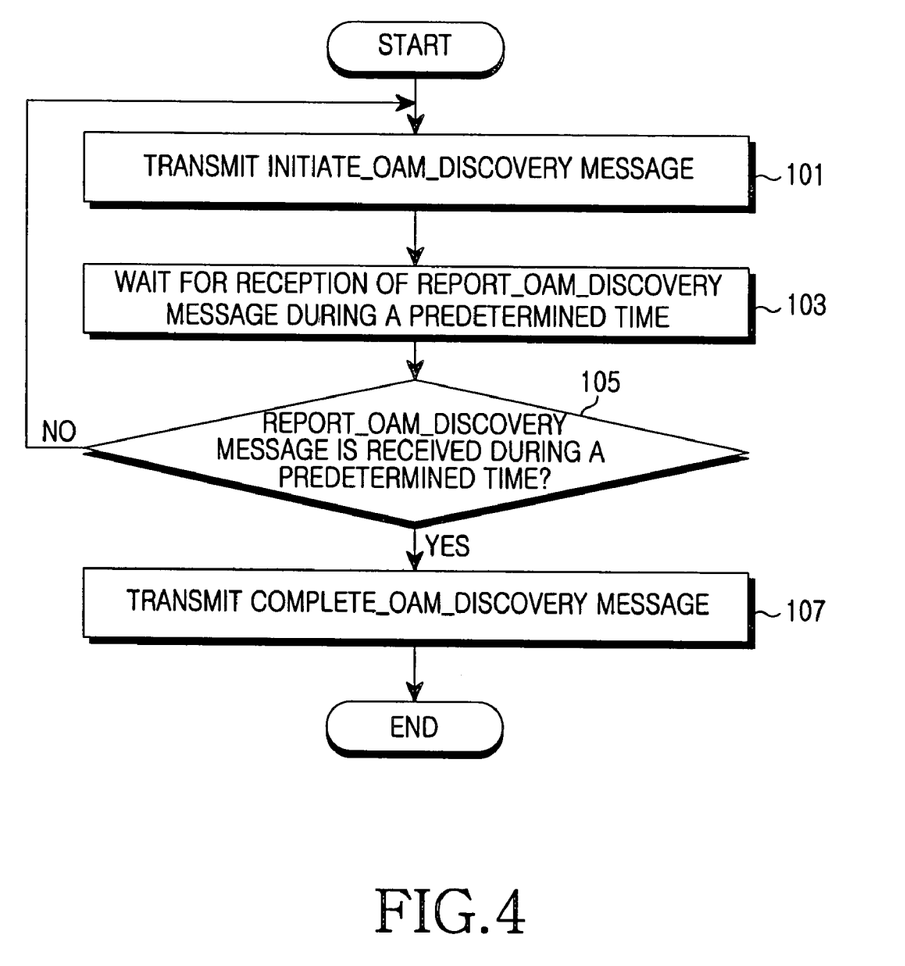
FIG. 4 is a flow chart illustrating an operation state of the OLT in an OAM capability discovery process according to an embodiment of the present invention.
Figure 5:
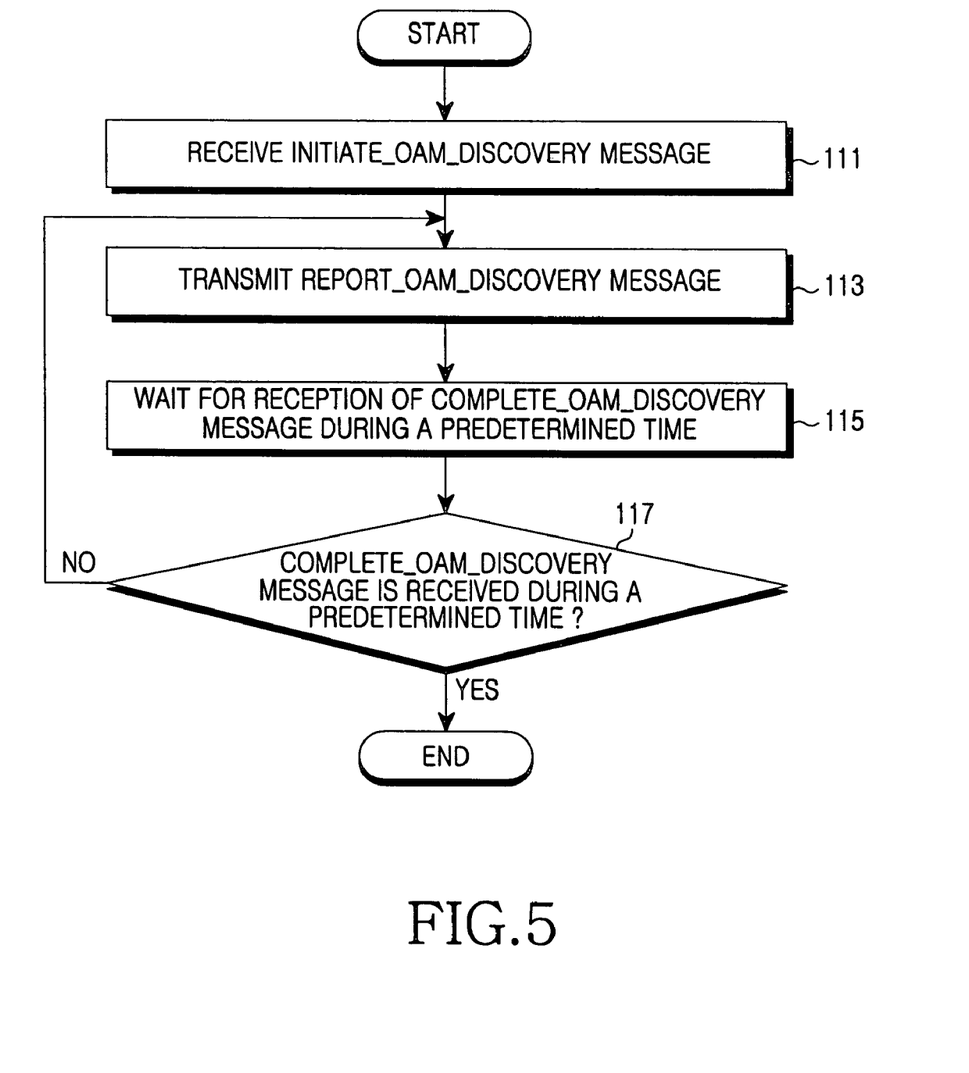
FIG. 5 is a flow chart illustrating an operation state of the ONU in an OAM capability discovery process according to an embodiment of the present invention.

Now, detailed operation processes for each of the OLT 100 and the ONU 110 according to the above-mentioned steps are shown in FIGS. 4 to 5.

First, an operation of the OLT 100 in an the OAM capability discovery process according to the present invention is described with reference to FIG. 4. In step 101, in order to start the OAM capability discovery, the OLT 100 transmits to the registered ONU 110 the "Initiate_OAM_Discovery" message in which the OAM capability of the OLT 100 has been stored, and then step 103 is performed. In step 103, the OLT 100 waits for the reception of the "Report_OAM_Discovery" message from the ONU 110 within a predetermined time period. Next, in step 105, when the "Report_OAM_Discovery" message is received from the ONU 110 within the predetermined time period, step 107 is performed. If the "Report_OAM_Discovery" message is not received from the ONU 110 during the predetermined time period, the step 101 to step 105 are repeated. Finally, in step 107, the OLT 100 transmits the "Complete_OAM_Discovery" message to the ONU 110, and then ends the OAM capability discovery process.

Next, an operation of the ONU 110 in an OAM capability discovery process according to the present invention is described with reference to FIG. 5. The ONU 110 receives the "Initiate_OAM_Discovery" message from the OLT 100 in step 111, and then step 113 is performed. In step 113, the ONU 110 transmits to the OLT 100 the "Report_OAM_Discovery" message in which the OAM capability of the ONU 110 has been stored, and then step 115 is performed. In step 115, the ONU 110 waits for the reception of the "Complete_OAM_Discovery" message from the OLT 100 within a predetermined time period. Next, in step 117, when the "Complete_OAM_Discovery" message is received from the OLT 100 during the predetermined time period, the ONU 110 ends the OAM capability discovery process. If the "Complete_OAM_Discovery" message is not received from the OLT 100 during the predetermined time period, the step 113 to step 117 are repeated.

Figure 6:
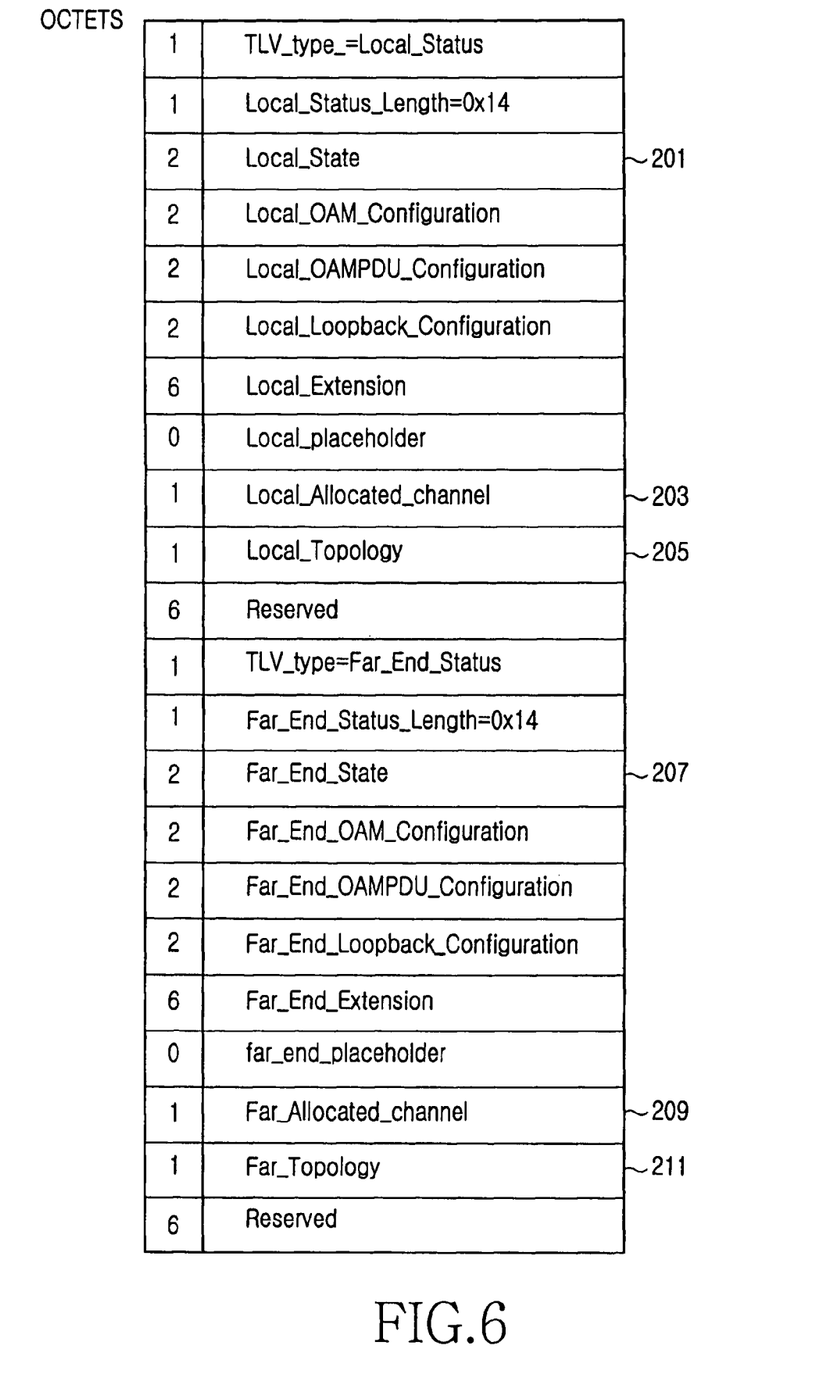
FIG. 6 is a view showing a data field structure of an OAM state PDU_according to an embodiment of the present invention.
Figure 7:
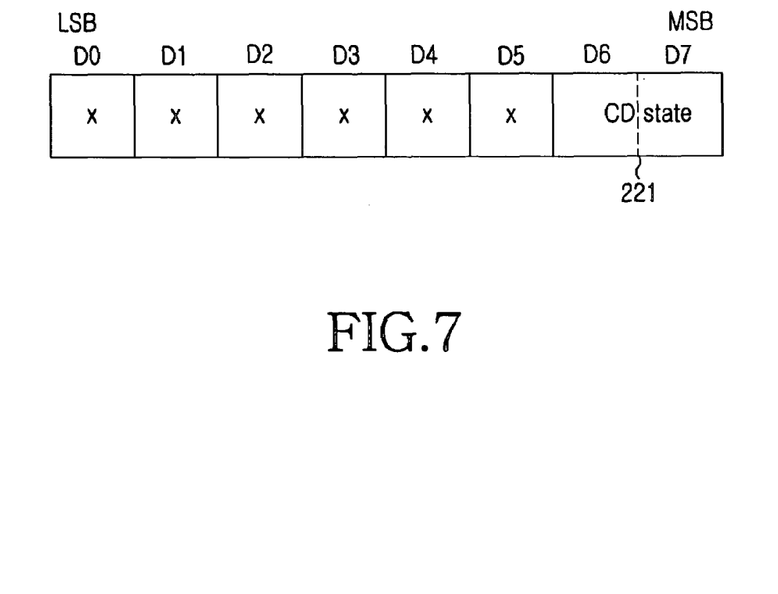
FIG. 7 is a view showing a bit encoding structure of a local/far_end_state field according to an embodiment of the present invention.
Figure 8:
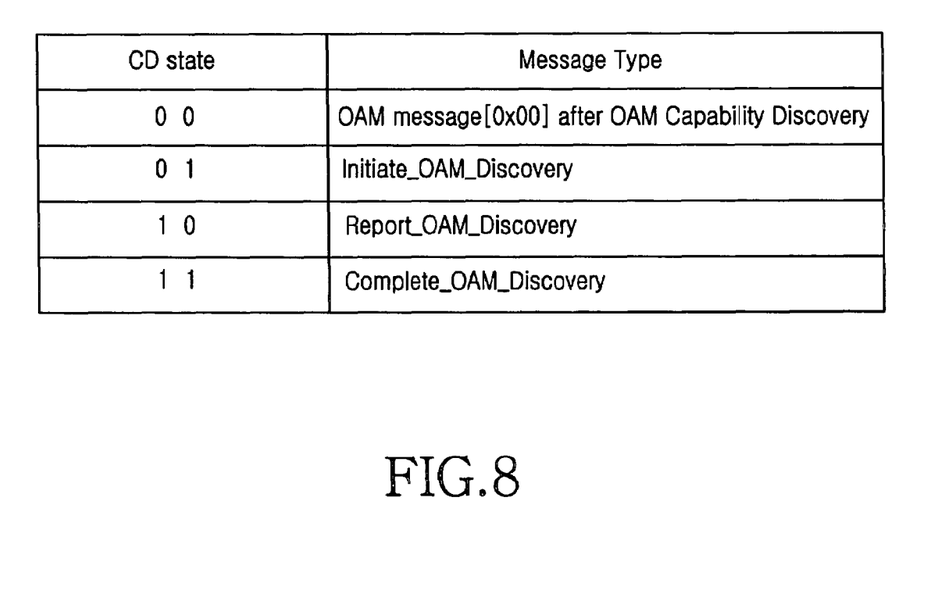
FIG. 8 is a view showing the kinds of messages classified by bit encoding of a local/far_end_state field according to an embodiment of the present invention; and APPENDIX A is a copy of ITU-T Standard G.983.1.

Referring to FIGS. 6-8, a data field structure of each message transmitted/received during the OAM capability discovery process described above is described.

FIG. 6 illustrates the data field structure of an OAM state PDU, which is a data field structure of each message that is actually transmitted/received through out the OAM capability discovery processes. The table includes a column on the left which indicates the quantity of OCTETS (8 bits each) that each field comprises. As shown, each message according to an embodiment of the present invention includes not only data fields of an OAM state PDU of a general structure, but also a Local_Allocated_channel field 203 having a size of one byte and a Far_End_Allocated_channel field 209 having a size of one byte, a Local_Topology field 205, a Far_End_Topology field 211, a Local_State field 201 and a Far_End_State field 207.

The Local_Allocated_channel field 203 and the Far_End_Allocated_channel field 209 are fields in which a static allocated bandwidth information is stored in order to transmit OAM capability information when the OAM capability discovery is performed. In addition, the Local_Topology field 205 and the Far_End_Topology field 211 are fields for storing transmission information regarding a network topology, i.e., a point-to-point network structure or a point-to-multi-point network structure during the OAM capability discovery.

The Local_State field 201 and the Far_End_State field 207 are defined newly according to the embodiment of the present invention and represent fields including information regarding the type of messages transmitted/received through the OAM capability discovery process. Bit encoding structure of the Local_State field 201 and the Far_End_State field 207 is shown in FIG. 7. As shown, the Local_State field 201 and the Far_End_State field 207 represent the classification of each message transmitted/received through the OAM capability discovery process by newly defining D6 bit and D7 bit as CD state (Capability Discovery State) field in a bit encoding structure of a conventional Local_State field and the Far_End_State field.

The type of messages classified by the CD state field values are shown in FIG. 8. As shown in FIG. 8, the CD state value of the "Initiate_OAM_Discovery" message is 01, the CD state value of the "Report_OAM_Discovery" message is 10, and the CD state value of the "Complete_OAM_Discovery" message is 11. Further, a CD state value of an OAM message, which utilizes OAM Status PDU [0×00] after the OAM capability discovery has completed, is 00.

As described above, the present invention can perform the OAM information exchange effectively by defining a 3-way handshaking-based OAM capability discovery procedure. Moreover, the present invention can provide a high reliability for messages (Initiate_OAM_Discovery, Report_OAM_Discovery, Complete_OAM_Discovery) transmitted/received when the OAM capability discovery is performed, by setting the discovery_time, which is a reception waiting time period for waiting a message.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for discovering by an OLT (Optical Line Termination) OAM (Operations, Administration & Maintenance) capabilities of multiple ONUs (Optical Network Units) connected to the OLT in an Ethernet passive optical network, the method comprising the steps of:

assigning OLT identifications for identifying each of the ONUs according to registration requests from the ONUs connected to the OLT, and starting by the OLT an OAM capability discovery operation for the OAM capabilities of the ONUs by transmitting first OAM capability information messages, which requests OAM capabilities of the ONUs, respectively; and receiving by the OLT second OAM capability information messages that include OAM capabilities of the respective ONUs, said second OAM capability messages being sent by the respective ONUs in response to a request for OAM capabilities from the OLT in the first OAM capability information message;

wherein the OAM capability information message includes a field for representing an operation state of the OAM capability information message.

2. The method as claimed in claim 1, further comprising a step of transmitting by the OLT a third OAM capability information message for reporting completion of the OAM capability discovery operation to a predetermined ONU from among the respective ONUs when the OLT receives the second OAM capability information message from the predetermined ONU.

3. The method as claimed in claim 1, wherein a structure of a data field constituting each of the messages has a first field and a second field, which are added to a general structure of an OAM state PDU (packet data unit) data field, the first field storing static allocated bandwidth information in order to transmit the OAM capability when the OAM capability discovery operation is performed, and the second field storing information on a network topology.

4. The method as claimed in claim 1, wherein the field for representing the operation state of the OAM capability information message includes one of:

a first set value for representing that the OLT starts the discovery operation for the OAM capabilities of the ONUs;

a second set value for representing report of the OAM capabilities of the ONUs;

a third set value for representing the completion of the OAM capability discovery operation by the OLT; and a fourth set value for representing an OAM state PDU after the completion of the OAM capability discovery operation.

5. A method for discovering by an OLT (Optical Line Termination) OAM (Operations, Administration & Maintenance) capabilities of multiple ONUs (Optical Network Units) connected to the OLT in an Ethernet passive optical network, the method comprising the steps of:

(a) assigning by the OLT identifications for identifying each of the ONUs according to registration requests from the ONUs connected to the OLT, and transmitting by the OLT first OAM capability information messages, which requests OAM capabilities of the ONUs, respectively, for starting an OAM capability discovery operation for the ONUs to the ONUs;

(b) waiting by the OLT for reception of second OAM capability information messages for reporting OAM capabilities from the respective ONUs during a first predetermined period of time after transmission of the first OAM capability information messages; and (c) transmitting by the OLT third OAM capability information messages for reporting completion of the OAM capability discovery operation by the OLT to the respective ONUs having transmitted the second OAM capability information messages, when the second OAM capability information messages are received from the ONUs;

wherein the OAM capability information message includes a field for representing an operation state of the OAM capability information message.

6. The method as claimed in claim 5, further comprising a step of retransmitting by the OLT the first OAM capability information messages for starting the OAM capability discovery operation for the ONUs according to the step (a), when the second OAM capability information messages are not received from the respective ONUs during the first predetermined period of time for which the OLT waits the reception of the second OAM capability information messages.

7. The method as claimed in claim 6, wherein the ONU retransmits the second OAM capability information message for reporting the OAM capability of the ONU when the third OAM capability information message for reporting the completion of the OAM capability discovery operation for the ONU is not received from the OLT during the second predetermined period of time.

8. The method as claimed in claim 5, wherein each of the respective ONUs receives the first OAM capability information message for starting the OAM capability discovery operation from the OLT, wherein each ONU of the respective ONUs performs the following steps:

transmits the second OAM capability information message for reporting OAM capability of the ONU to the OLT, and waits for the third OAM capability information message from the OLT for reporting the completion of the OAM capability discovery operation for the ONU during a second predetermined period of time.

9. The method as claimed in claim 5, wherein a structure of a data field constituting each of the messages has a first field and a second field, which are added to a general structure of an OAM state PDU (packet data unit) data field, the first field storing static allocated bandwidth information in order to transmit the OAM capability when the OAM capability discovery operation is performed, and the second field storing information on a network topology.

10. The method as claimed in claim 5, wherein the field for representing the operation state of the OAM capability information message includes one of:

a first set value for representing that the OLT starts the discovery operation for the OAM capabilities of the ONUs;

a second set value for representing report of the OAM capabilities of the ONUs;

a third set value for representing the completion of the OAM capability discovery operation by the OLT; and a fourth set value for representing an OAM state PDU after the completion of the OAM capability discovery operation.

* * * * *